(12) United States Patent
Crinon

(10) Patent No.: US 6,801,575 B1
(45) Date of Patent: Oct. 5, 2004

(54) AUDIO/VIDEO SYSTEM WITH AUXILIARY DATA

(75) Inventor: Regis J. Crinon, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/085,393

(22) Filed: May 27, 1998

Related U.S. Application Data

(60) Provisional application No. 60/049,078, filed on Jun. 9, 1997.

(51) Int. Cl.[7] .............................. H04N 7/12; H04N 7/18; G06K 9/46
(52) U.S. Cl. ............................ 375/240.26; 375/240.08; 382/243; 725/74
(58) Field of Search .................. 375/240.26, 240.24, 375/240.09, 240.01, 240; 348/414.1, 420.1, 429.1, 423.1, 554; 382/242, 243; 343/397.1; 345/302, 157, 719; 707/526, 101; 709/217; 725/105, 142, 131

(56) References Cited

U.S. PATENT DOCUMENTS

| 5,065,345 | A | | 11/1991 | Knowles et al. | |
|---|---|---|---|---|---|
| 5,109,482 | A | | 4/1992 | Bohrman | |
| 5,276,805 | A | | 1/1994 | Hamaguchi | 395/164 |
| 5,367,621 | A | | 11/1994 | Cohen et al. | 395/154 |
| 5,448,726 | A | | 9/1995 | Cramsie et al. | 395/600 |
| 5,453,779 | A | | 9/1995 | Dan et al. | |
| 5,528,513 | A | | 6/1996 | Vaitzblit et al. | |
| 5,539,871 | A | | 7/1996 | Gibson | |
| 5,563,648 | A | * | 10/1996 | Menand et al. | 725/105 |
| 5,572,643 | A | | 11/1996 | Judson | 395/793 |
| 5,596,705 | A | | 1/1997 | Reimer et al. | |
| 5,708,845 | A | | 1/1998 | Wistendahl et al. | |
| 6,079,566 | A | * | 6/2000 | Eleftheriadis et al. | 707/101 |
| 6,092,107 | A | * | 7/2000 | Eleftheriadis et al. | 725/74 |
| 6,151,017 | A | * | 11/2000 | Suzuoka et al. | 345/302 |
| 6,377,309 | B1 | * | 4/2002 | Ito et al. | 345/554 |

FOREIGN PATENT DOCUMENTS

| EP | 0 596 823 A3 | 5/1994 |
|---|---|---|
| EP | 0 596 823 A2 | 5/1994 |

OTHER PUBLICATIONS

Koenen, Bob, "MPEG–4: Context and Objectives," Signal Processing: Image Communication, 1997, vol. 9, pp. 295–304.

Ebrahimi, Touradj, MPEG–4 Video Verification Model: A Video Encoding/Decoding Algorithm Based on Content Representation, Signal Processing: Image Communication, 1997, vol. 9, pp. 367–384.

Burrill, Victoria, "Time–varying Sensitive Regions in Dynamic Multimedia Objects: A Prgamatic Approach to Content–Based Retrieval From Video," Information and Software Technology, 1994, vol. 36, pp. 213–223.

"Multimedia Hypervideo Links for Full Motion Videos," IBM Technical Disclosure Bulletin, vol. 37, No. 4A, Apr. 1, 1994, p. 95.

* cited by examiner

*Primary Examiner*—Gims Philippe
(74) *Attorney, Agent, or Firm*—Chernoff, Vilhauer, McClung & Stenzel, LLP

(57) ABSTRACT

A video system includes a plurality of frames of video each of which is defined by a plurality of scene elements. The scene elements for a respective frame together define an image of the frame. First auxiliary data is descriptive of a first scene element of the frame and second auxiliary data is descriptive of a second scene element of the frame. A sending device sends the frame of video, including its scene elements, the first auxiliary data, and the second auxiliary data, from the sending device to a receiving device.

18 Claims, 5 Drawing Sheets

AUDIO/VIDEO SYSTEM WITH AUXILIARY DATA

The present application is a continuation of co-pending patent application, Sezen et al., Ser. No. 60/049,078, filed Jun. 9, 1997.

BACKGROUND OF THE INVENTION

The present invention relates to a system for encoding, sending, and receiving audio and video that includes auxiliary data.

Digitally encoding video, consisting of multiple sequential frames of images, is a common task that traditionally has been performed by dividing each frame into a set of pixels and defining a sample luminance value, and possibly a color sample value, for each pixel. The development of powerful inexpensive computer technology has made it cost effective to develop complex systems for encoding moving pictures to achieve significant data compression. This permits, for example, high definition television (HDTV) to be broadcast within a limited bandwidth. The international standard which has been chosen for the transmission of HDTV is the Moving Pictures Experts Group 2 (MPEG-2) standard. The MPEG-2 video compression standard is based on both intra and inter coding of video fields or frames and achieves compression by taking advantage of either spatial or temporal redundancy in the video sequence.

An additional video encoding system has been proposed, designated as the MPEG-4 standard. MPEG-4 is a system of encoding video by which a moving picture composed of a sequence of sequential frames, generally accompanied by audio information, may be transmitted or otherwise sent from a moving picture sending device ("sender") to a moving picture receiving device ("receiver") in an efficient and flexible manner. Interactive applications are also anticipated in the MPEG-4 standard, but for ease of description, this patent application describes the case in which a moving picture is sent from the sender to the receiver only. It is to be understood that this patent application includes the case in which control information may be sent from receiver to sender.

MPEG-4 supports the transmission of a "Binary Format for Scene Description" (BIFS) which specifies the composition of objects in a sequence of frames or fields representing a three dimensional scene. In BIFS a scene is divided into a plurality of "scene elements." For example, as shown in FIG. 1A, a scene with a presenter, a blackboard, a desk, a globe, and an audio accompaniment is broken up into scene elements in panel 12, and reconstituted into a complete scene, with all the scene elements properly arranged in panel 14. In other words, each frame of a MPEG-4 based video system is composed of a plurality of scene elements that are arranged according to directives specified in the associated BIFS information. As such MPEG-4, similar to MPEG-2, is directed to a system for encoding and transmitting video and audio information for viewing a movie, albeit using a different protocol than MPEG-2. An example of a suitable systems decoder for MPEG-4 is shown in FIG. 1B.

Referring to FIG. 2, each scene element 20 is represented by an object to which is assigned a node 26 in a generally hierarchical tree structure (panel 16). The scene elements requiring input streaming data include an object descriptor 14. The tree structure provides a convenient data structure for representing a sequence of video fields or frames. Each object descriptor in turn includes at least one elementary stream descriptor 28 which includes such information as the data rate, location information regarding the associated data stream(s) and decoding requirements for its respective logical channel (described below) for updating information regarding the data object. The data stream sent through a particular pipe for a particular object descriptor is generally referred to as an elementary stream. Such information may include, for example, data describing a change in shape, colorization, brightness, and location. Every elementary stream descriptor includes a decoder type (or equivalent stream type structure) which publishes the format or encoding algorithm used to represent the transmitted elementary stream data. FIGS. 3 and 4 show a simplified object descriptor format and an elementary stream descriptor format, respectively.

In an MPEG-4 system, both the sender and the receiver can use a respective "Delivery Multimedia Integration Framework" (DMIF) for assigning the data channels and time multiplexing scheme based on requests from the MPEG-4 applications. The DMIF, in effect, acts as an interface between an MPEG-4 application and the underlying transport layer, sometimes referred to herein as a "data pipe." The pipes generally refer to the physical or logical interconnection between a server and a client. As an object descriptor is sent from the sender to the receiver, the sender DMIF examines each of its elementary stream descriptors 28 and assigns a pipe to each one based on the requirements 30, 32, 34 and 36 included in the elementary stream descriptors 28. For example, an elementary stream with a more exacting quality of stream requirement 34 would be assigned a pipe that would permit high quality transmission. The pipe assignment is sent to the receiving DMIF. For example, depending on the transmission system each pipe (logical channel) could be a different periodic time portion of a single connection; each pipe could be different connection through the internet; or each pipe could a be different telephone line. In general, DMIF establishes the connections and ensures that both the sender and the receiver are in synchronization for tying a particular pipe to a particular elementary stream at both the sending and the receiving end.

The DMIF also assigns an association tag to each elementary stream. This tag provides a single identification of each elementary stream from the sending DMIF to the receiving DMIF and vice versa. Accordingly, the association tag is a unique end-to-end DMIF pipe identifier. Any channel change or reassignment initiated by the sender or receiver (for an interactive system) would require a different association tag.

Referring to FIG. 1B, DMIF delivers data to an MPEG-4 application by way of "Access Unit Layer Protocol Data Units" (AL-PDUs). The AL-PDUs configuration descriptor 26 in the elementary stream descriptor 28 (FIG. 4) specifies the AL-PDUs time coordination and required buffer size characteristics. The purpose is to ensure that AL-PDUs will arrive in a timely manner and conveying enough data to permit the data object to be fully updated for timely display. The AL-PDUs are stored in decode buffers, are reassembled into access units, are decoded (in accordance with the Decoder Type associated with the elementary stream), and stored in a configuration buffer, to be placed into the scene by the compositor which arranges the scene elements of the scene. DMIF also configures the multiplexing and access layer for each elementary stream based on its AL-PDU Configuration Descriptor. When DMIF is not used (typically in the case of a storage network), the association tag is substituted for a channel number identifying a logical or a physical channel containing the elementary stream.

The process of sending a video stream begins with a moving picture request from the receiver application (in a broadcast system the request goes no further than the receiver DMIF), followed by a sequence of data from a sender application designed to establish an initial scene configuration. In FIG. 4, one of the decoder types is for scene description and another is for object descriptors. In the initial scene configuration a number of object descriptors are typically established. Each data object descriptor includes at least one elementary stream descriptor.

Another issue faced in an MPEG-4 system is avoiding collision among elementary stream identifiers when two applications run simultaneously on top of the same DMIF session. Each elementary stream ID is unique within an application. Therefore, the underlying DMIF session must be able to distinguish requests from each application in the case where elementary stream ID values collide.

Hamaguchi U.S. Pat. No. 5,276,805 discloses an image filing system in which retrieval data for a first set of images is associated with image data for a first image that is logically associated with the first set of images. For example, a user viewing an x-ray image of a patient's kidney would be able to view a list of a set of x-ray images taken from the same patient and be able to quickly view any of the set of x-ray images upon request. Hamaguchi teaches that the retrieval information is associated with the image as a whole.

Judson U.S. Pat. No. 5,572,643 discusses an already existing technology, known as hypertext, by which an internet browser permits a user to access an internet URL by clicking on a highlighted word in a page accessed on the internet. Judson teaches that the retrieval information is associated only with the test. Cohen et al. U.S. Pat. No. 5,367,621 is quite similar to Judson, permitting a user to click on a word in an on-line book, thereby causing a multimedia object to be displayed. Both Judson and Cohen et al. disclose advances linking together data which is unrelated to the encoding and data compression necessary for MPEG-2 and MPEG-4.

SUMMARY OF THE INVENTION

In a first embodiment, the present invention is a video system that includes a plurality of frames of video each of which is defined by a plurality of scene elements. The scene elements for a respective frame together define an image of the frame. First auxiliary data is descriptive of a first scene element of the frame and second auxiliary data is descriptive of a second scene element of the frame. A sending device sends the frame of video, including its scene elements, the first auxiliary data, and the second auxiliary data, from the sending device to a receiving device.

Auxiliary data is data which does not directly represent audio or video but is at least one level of abstraction away from a direct audio or video representation or is information which is in some way related to the object. By including auxiliary data with the video system descriptive of the individual scene elements, in contrast to the entire frame, additional information specific to scene elements becomes available to the receiver. As an example, the additional information may be displayed on command or used to further process the video information. This information may or may not be synchronized to the data stream(s) conveying the scene element sequence.

In another embodiment of the present invention the video system includes a plurality of frames of video, each of which defines an image. Each of the frames is defined by a plurality of pixels. First auxiliary data is descriptive of a first portion of the pixels of the frame and associated with a first portion of the pixels. Second auxiliary data is descriptive of a second portion of the pixels of the frame and associated with a second portion of the pixels. A sending device sends the first portion of the pixels, the first auxiliary data, the second auxiliary data, and the second portion of the pixels to a receiving device.

The inclusion of auxiliary data into video systems that define each frame by a group of pixels, such as MPEG-2, allows sub-portions of each frame to be associated with the auxiliary data for subsequent use.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

When MPEG-4 was first conceived, it was anticipated that it would be a system for compressing and then subsequently decompressing and displaying visual and audio data. This is in accordance with previous video compressing systems, such as MPEG-2. The present inventor came to the realization that other types of data that are specific to scene elements would be useful to the user and greatly expand the potential of an MPEG-4 system. For example, information concerning a visual object, such as the height of a building, the make or model of an automobile, a basketball player's statistics, or a link (pointer) to related information may be of interest to a viewer. Also, statistical information about the visual object, for instance a color description describing and quantifying the coloration of a particular object may be of use to the receiver in correctly displaying the object. In addition, data describing audio elements may also be included. This type of data is, in this application, referred to as "auxiliary data." Auxiliary data is data which does not directly represent audio or video but is at least one level of abstraction away from a direct audio or video representation or is information which is in some way related to the object. Auxiliary data can be used to enhance the original video/audio service experienced by the viewers.

In a preferred embodiment of the present invention, auxiliary data may be displayed, on command, in association with a scene element. For example, a person watching a basketball game may wish to learn more about any one of the players. Television sets, or other display systems, may be equipped with a mouse, a remote command unit, or other pointing device to select scene elements being displayed. Using such a device, a viewer could point to one of the basketball players, press a button, and thereby cause the players statistics to be displayed. Such auxiliary data may be transmitted in a simple ASCII format. The user may select where the information is displayed, for example at either the top or bottom of the screen. Another use for auxiliary data is for an on-screen program guide with brief program descriptions. The brief program descriptions of the program guide provided may be selected to obtain a more complete description of the programming. Yet another use of auxiliary data is to obtain additional information about an actor while viewing a television show.

Other uses for the auxiliary data could be in conjunction with "hot buttons" displayed on the television screen. For example, there could be a hot button for a prewritten commentary on the show, or to allow the viewer to see and to add to a running commentary by viewers watching the show.

Figure 1A:
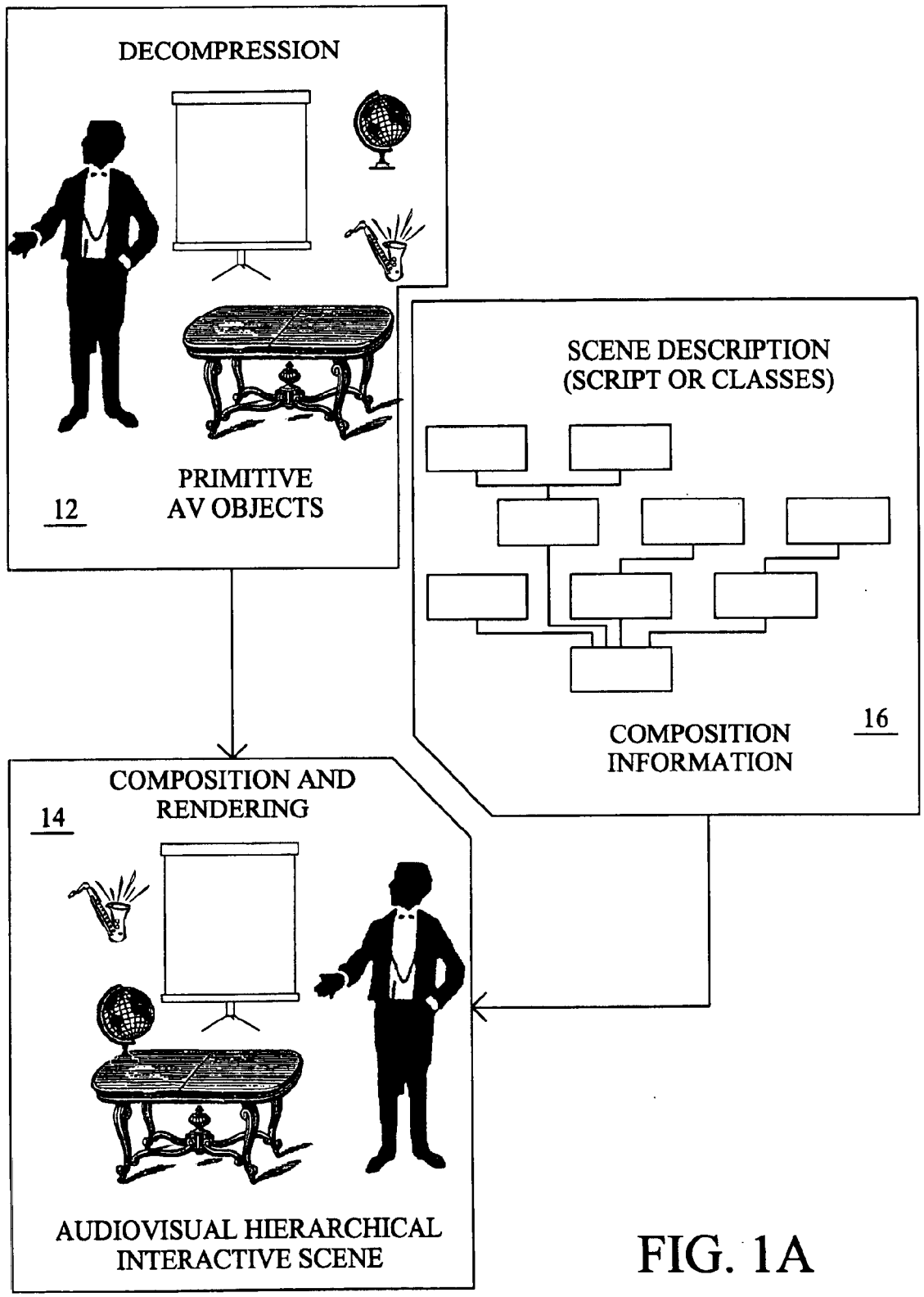
FIG. 1A is an illustration of the data encoding and scene reconstruction of MPEG-4.
Figure 1B:
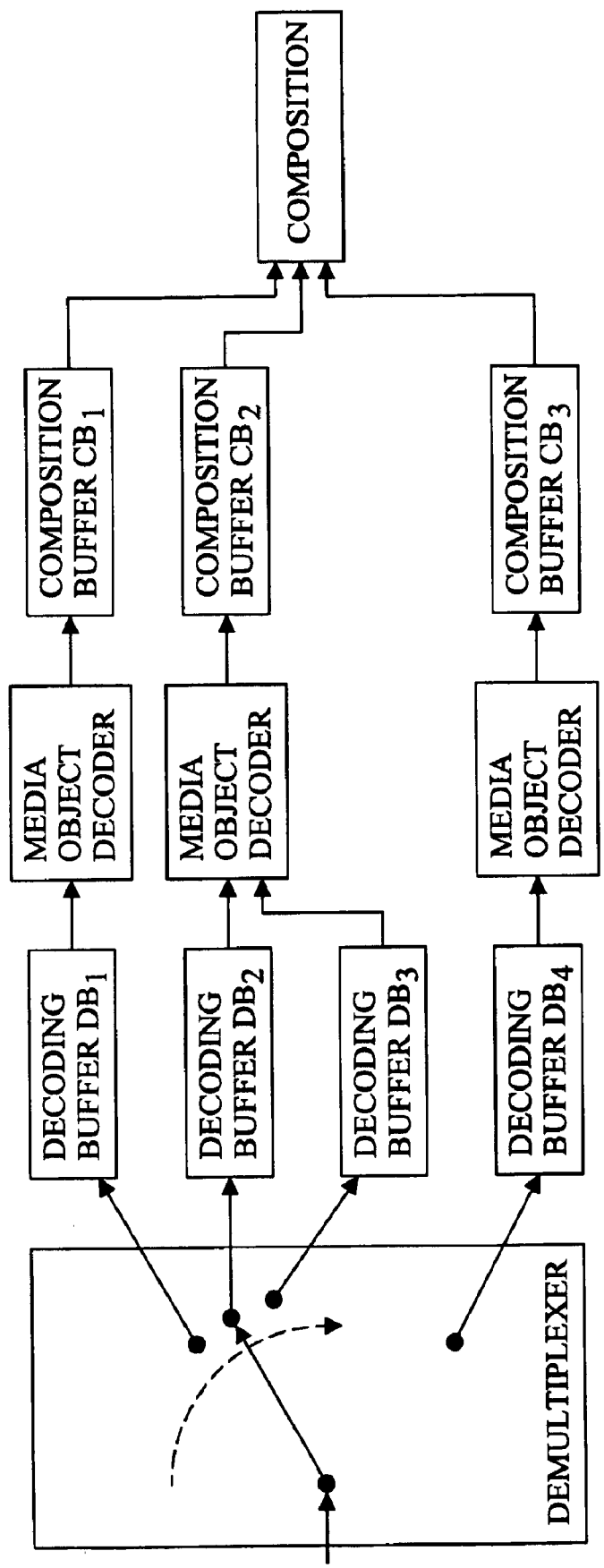
FIG. 1B is an illustration of a systems decoder for MPEG 4.
Figure 2:
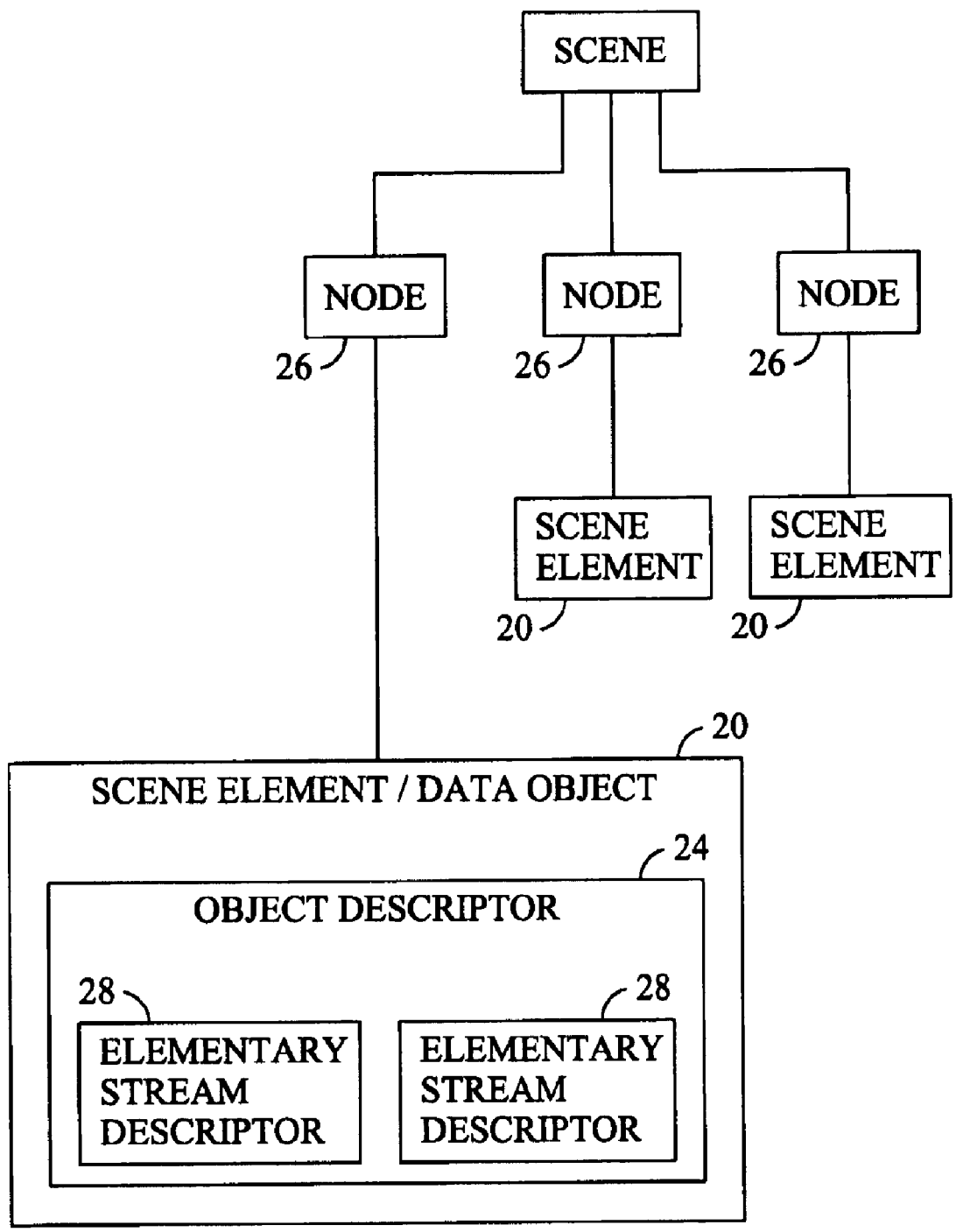
FIG. 2 is an illustration of the data structure of MPEG-4.
Figure 3:
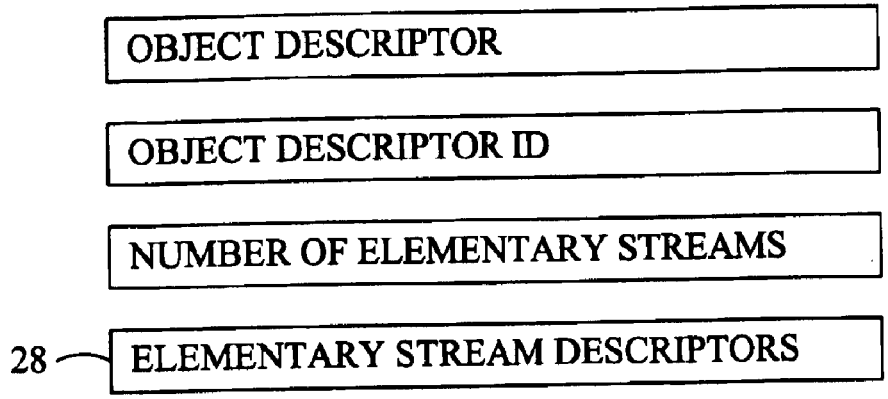
FIG. 3 is an illustration of an MPEG-4 object descriptor.
Figure 4:
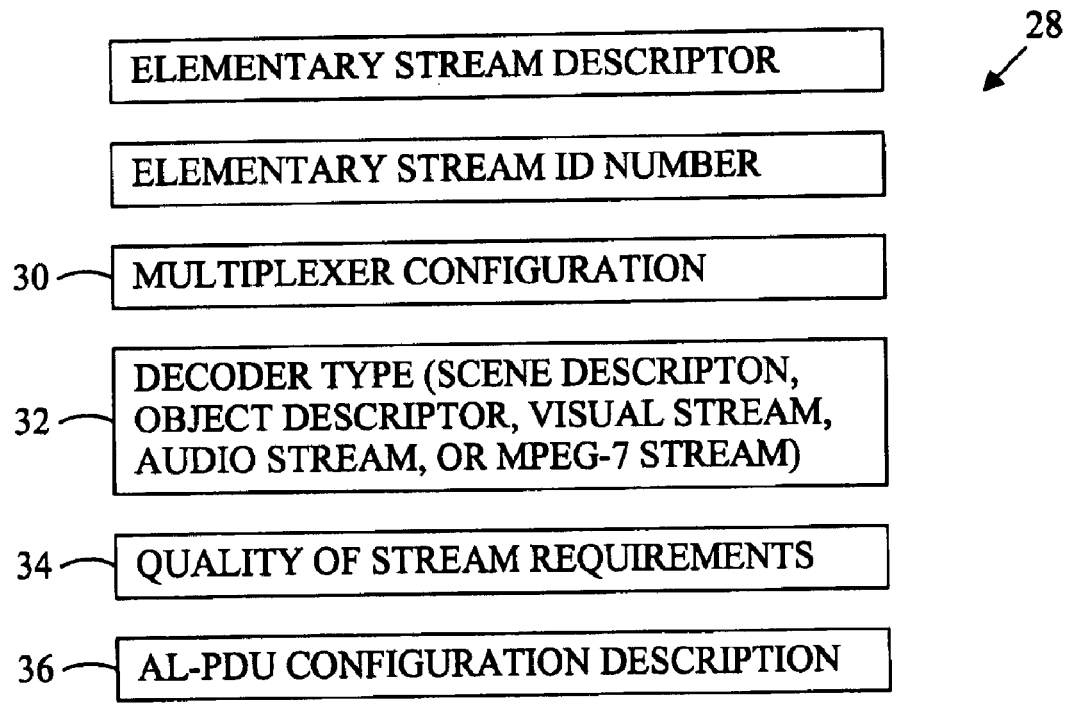
FIG. 4 is an illustration of an MPEG-4 elementary stream descriptor.

The preferred embodiment of the present invention includes an elementary stream descriptor, similar to that shown in FIG. 2 but in which one or more decoder type (or equivalently, stream type) structures announce the presence of one or several auxiliary data streams encoded according to the format specified by decoder type. The elementary stream descriptor(s) including such decoder type (or stream type) structure may be included in an object descriptor featuring elementary stream descriptor featuring other values of decoder type (or stream type) like MPEG-4 visual streams. In this case the auxiliary data is associated with and complements the elementary streams published by these elementary stream descriptor(s). In another situation, the elementary stream descriptors announcing the presence of auxiliary data may be included in an object descriptor which does not feature elementary stream descriptors featuring other kinds of decoder type (or stream type). In this situation, the auxiliary data may be associated and may complement a scene element 20 in a node 26 which is directly linked to the node publishing the auxiliary data object descriptor.

The present invention ensures that the elementary streams and the associated auxiliary data streams can be unambiguously identified in the MPEG-4 player as a result of the DMIF assigning an association tag to each elementary stream. The association tag data is transmitted via a control message from the sender DMIF and to the receiver DMIF. A separate channel handle uniquely representative of the use of an association tag by an application is assigned at run-time by the server and the client DMIF, respectively. Not only does this provide the receiving application with a shorthand way of referencing the channel conveying the AL-PDUs, but it avoids confusion when at least two applications using the same elementary stream identifier are running simultaneously in the same DMIF session.

Figure 5:
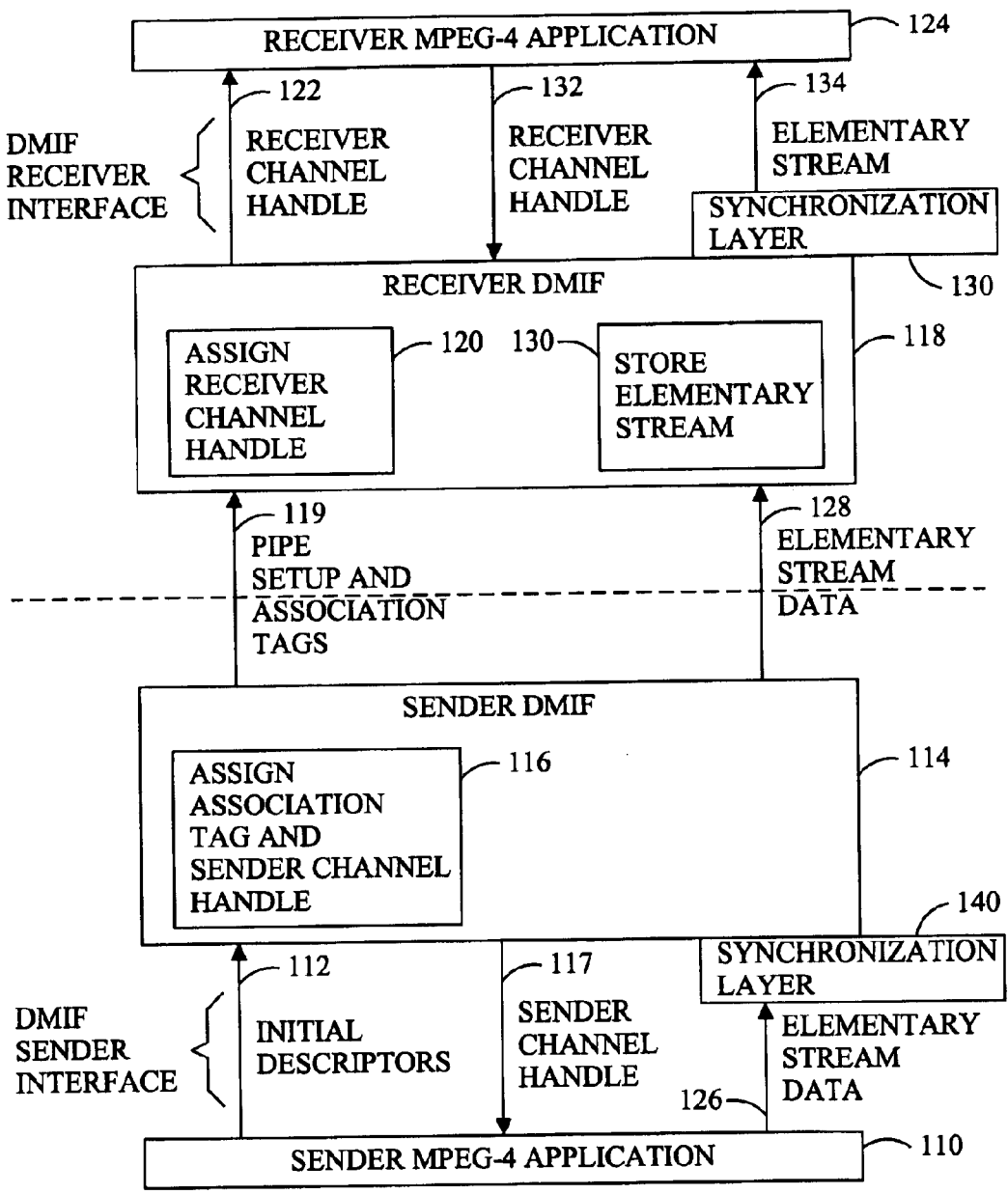
FIG. 5 is an illustration of a receiver DMIF and a sender DMIF user interfaces according to the present invention.

FIG. 5 illustrates the assignment of association tags and channel handles. The sender MPEG-4 application 110 sends the initial object descriptors, including elementary stream descriptors (transmission 112) to the sender DMIF. The sender DMIF 114 during setup assigns an association tag and a sender MPEG application program channel handle to each requested elementary stream (step 116) and passes the sender channel handle back to the sender MPEG-4 application (step 117). The receiver DMIF 118 assigns a receiver channel handle to each requested elementary stream (step 120) and passes it (step 122) to the receiver MPEG-4 application 124, thus creating an end-to-end pipe indicator composed of the sender channel handle, association tag, and receiver-channel handle. When elementary stream data is sent from the sender MPEG-4 application 110 to the sender DMIF 114, it is first processed by the MPEG-4 synchronization layer 140. The packetized, possibly time stamped, possibly multiplexed elementary stream is then transmitted to the receiver DMIF (step 128) and then processed by the receiver MPEG-4 synchronization layer 130 which reassembles the elementary stream as well as ensures timely presentation of the data to the application.

In an alternative embodiment of the present invention, MPEG-2 is equipped with a similar feature. The auxiliary data is inserted and multiplexed at the sending device into an MPEG-2 transport stream. In one preferred embodiment, the auxiliary at the sending device into an MPEG-2 program. This is accomplished by assigning a special stream type value specifying that the type of program element carried within the packets is auxiliary data encoded according to a particular format. Values of stream type have already been defined in Table 2-29 of the MPEG-2 systems specification (IEC/ISO 13818-1) which permit the announcement of various video, audio and command/control protocol streams. The stream type value assigned to the auxiliary data stream is then transmitted to the receiver by means of the TS program map sections structure defined in Table 2-28. The auxiliary data stream(s) stream type and elementary PID value(s) are added to the relevant program (defined by program number in the TS program map sections structure). The inner descriptor loop in the TS program map section may be used in connection with the auxiliary data stream type to provide additional, high level, information about the auxiliary data service. The TS program map sections allows the transmission and reconstruction in the receiver of the program map table. The program map table provides the mapping between program numbers and the program elements comprising them. The elementary PID value associated with the auxiliary data stream type specifies the packets conveying the auxiliary data in the MPEG-2 transport stream. The auxiliary data is associated and enhances the service provided by other streams (video or audio elementary streams, for example) published in the program map table. Each program may feature one or several auxiliary data streams. In another embodiment, the auxiliary data streams are announced and associated with other streams like video or audio elementary streams in an MPEG-2 program stream map structure (defined in Table 2-35 of ISO/IEC 13818-1). This is achieved by assigning a particular (stream type, elementary stream ID) tuple to announce a particular auxiliary data stream format. Values of elementary stream ID have already been defined in Table 2-18 of ISO/IEC 13818-1 which can be used to publish the presence of video or audio streams in the multiplexed stream. The inner descriptor loop associated with the auxiliary data stream type may be used to convey additional, high level information about the auxiliary data service. In either embodiments, and if the program includes reference to at least one video elementary stream, a given auxiliary data stream may be associated with only a portion of the transmitted video portion. Such portion may correspond to a specific region on the television display screen. In other words, the auxiliary data is associated with a particular block of picture elements (pixels) of a scene. Because of encoding mechanism used by MPEG-2 video specification (ISO/IEC 13818-2), it is preferable to define such picture block to coincide with boundaries of a set of contiguous 16×16 pixel blocks. Furthermore, if the data object to which the auxiliary data was associated at the sending device was moving about the screen, the auxiliary data may be reassigned to pixel sets on substantially a frame-to-frame or field-to-field basis.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A video system comprising:
   (a) a plurality of frames of video each of which is defined by a plurality of scene elements, where said plurality of scene elements for a respective frame together define an image of said respective frame, wherein each of said scene elements is a separately encoded image with respect to other scene elements for said respective frame, wherein said image is created by composing said separately encoded scene elements within a respective frame based upon location information defining the position of said scene elements within said respective frame by a receiving device of said video system;
   (b) first auxiliary data descriptive of the content of a first scene element of said plurality of scene elements for said respective frame;
   (c) second auxiliary data descriptive of the content of a second scene element of said plurality of scene elements for said respective frame; and
   (d) a sending device that sends a bitstream representing said respective frame of said video, including respective said separately encoded scene elements and said location information, said first auxiliary data, and said second auxiliary data, from said sending device to said receiving device, wherein said separately encoded scene elements are sent from said sending device to said receiving device using at least two elementary streams.

2. The video system of claim 1 wherein said video includes audio information.

3. The video system of claim 1 wherein said scene elements are overlapping.

4. The video system of claim 1 wherein said first auxiliary data is a set of descriptors and parameter values resulting from said first scene element.

5. The video system of claim 1 wherein said first auxiliary data is not directly representative of an image.

6. The video system of claim 1 wherein said first auxiliary data is viewable on a display device by selecting said first scene element.

7. A video system comprising:
   (a) a plurality of frames of video each of which defines an image of said respective frame, each of said frames defined by a plurality of pixels;
   (b) first auxiliary data descriptive of the content of a first portion of said pixels of a respective frame and associated with said first portion of said pixels of a respective frame and associated with said first portion of said pixels;
   (c) second auxiliary data descriptive of the content of a second portion of said pixels of said respective frame and associated with said second portion of said pixels, where said first portion is different than said second portion; and
   (d) a sending device that sends said first portion of said pixels, said first auxiliary data, said second auxiliary data, and said second portion of said pixels to a receiving device.

8. The video system of claim 7 wherein said video includes audio information.

9. The video system of claim 7 wherein said first portion and said second portion are blocks of 16 by 16 pixels of said respective frame.

10. The video system of claim 7 wherein said first auxiliary data is a set of descriptors and parameter values resulting form said first portion.

11. The video system of claim 7 wherein said first auxiliary data is not directly representative of an image.

12. The video system of claim 7 wherein said first auxiliary data is viewable on a display device by selecting said first portion.

13. A video system comprising:
   (a) a plurality of frames of video each of which is defined by a plurality of scene elements, where said plurality of scene elements for a respective frame together define an image of said respective frame, wherein each of said scene elements is a separately encoded image with respect to other scene elements for said respective frame, wherein said image is created by composing said separately encoded scene elements within a respective frame based upon location information defining the position of said scene elements within said respective frame by said video system;
   (b) each of said scene elements defined by a scene description format including a scene element data object format that defines the number of elementary streams and elementary stream descriptors;
   (c) each of said elementary stream descriptors including a decoder type identifier;
   (d) each of said decoder type identifiers represents at least one of an audio stream, a video stream, object descriptor, and auxiliary data, with at least one of said decoder type identifiers represents said auxiliary data; and
   (e) said auxiliary data descriptive of the content of a respective one of said scene elements.

14. A system for encoding a moving picture comprised of a sequence of time separated frames depicting scenes, wherein each of said frames is defined by a plurality of scene elements, wherein each of the scene elements is a separately encoded image with respect to other scene elements for the respective frame, wherein said image is created by decoding a bitstream and composing said separately encoded scene elements within a respective frame based upon location information defining the position of said scene elements within said respective frame, said system comprising a scene description format, referencing at least one of said scene elements, including a scene element data object format that includes an elementary stream descriptor format including, in turn, a decoder type identifier format wherein any one of a set of decoder types may be represented by one out of a set of predetermined bit values and one of said predetermined bit values represents an auxiliary information decoder type, wherein said auxiliary information is descriptive of the content of at least one of said scene elements.

15. The system of claim 14 wherein an audio stream is also encoded.

16. A system for encoding a moving picture comprised of a sequence of time separated frames, wherein each of said frames includes a plurality of scene elements that are a separately encoded image with respect to other scene elements for a respective frame, said system adapted to divide said frames into scene elements, wherein said frame is created by composing said scene elements within said respective frame based upon location information defining the position of said scene elements within said respective frame by said system, and including a receiver display subsystem adapted to receive and display said frames and a pipe assignment subsystem adapted assign pipes to the scene elements and wherein said subsystem assigns at least one of a logical and physical transmission channel designator to each pipe and transmits a quantity representative of said pipe designator to said receiver display subsystem, wherein said system includes a plurality of auxiliary data descriptive of the content of a respective plurality of scene elements.

17. The system of claim 16 wherein an audio stream is also encoded.

18. The system of claim 13 wherein said plurality of frames including said scene elements are represented in a bitstream.

* * * * *